United States Patent Office 3,211,596
Patented Oct. 12, 1965

3,211,596
FABRICATION OF SOLID PROPELLANT POWDER GRAINS BY A POLYMERIZABLE SOLVENT EXTRUSION METHOD
John F. Kincaid, Moorestown, N.J., and Charles O. Metzger and Richard H. Cahill, Huntsville, Ala., assignors to the United States of America as represented by the Secretary of the Army
No Drawing. Filed Mar. 5, 1952, Ser. No. 275,024
8 Claims. (Cl. 149—98)

In the prior art, double base propellants for rocketry have been prepared by any one of three procedures, namely, solvent extrusion, solventless extrusion, and casting. Solvent extrusion procedures, while satisfactory for grains having a web dimension of one-half inch and under, are impractical with grains having a larger web size because of the difficulty and time required for complete removal of the solvent. Solventless extrusion, which is practicable for grains having a web size greater than one-half inch, involves the well-known hazardous differential rolling operation and, furthermore, often results in a non-homogeneous grain having inferior physical properties. The casting process normally used for production of large grains, requires the use of intricate, expensive and heavy equipment, numerous operations and an inevitable waste of material per grain. This procedure is therefore expensive and generally unsatisfactory except for grains having a diameter of the order of five inches or more.

We have found that propellant grains of any practicable size may be prepared by the use of a polymerizable solvent. By the use of such a solvent, a short curing cycle of less than 24 hours is possible with consequent great reduction of time and expense over prior art techniques. Furthermore, since curing is essentially independent of web size, limitations imposed by prior art procedures may be ignored. By varying the amount of monomer, by changing monomers, or by copolymerization, the physical properties of the finished grains may be altered at will.

It is therefore the principal object of our invention to provide a process by which propellant grains of any practicable and desired size may be prepared with substantial savings of time and expense over known prior art processes.

A second object is to provide a process which produces a propellant having uniform and homogeneous physical properties.

Another object is to provide a process by which predetermined physical properties may be imparted to the finished propellant grain.

Still another object is the provision of a propellant grain prepared by the foregoing processes having known, uniform and homogeneous physical properties.

These objects and other advantages of the invention will be apparent to those skilled in the art after a study of the following description.

We have found that the foregoing objects can be realized by utilizing, in a solvent-type procedure, a polymerizable solvent (for example, a monomer of the synthetic resin type) instead of the prior art volatile solvent.

In carrying the invention into effect, we utilize essentially the steps of (a) mixing ingredients including explosive or propellant materials and a liquid monomer, (b) extruding the mixed ingredients through orifices and (c) curing the extruded product. Among monomers suitable for use may be mentioned ethyl and methyl acrylate, and ethyl, methyl and n-butyl methacrylate.

The ingredients used in the production of the propellant may be nitroglycerin, nitrocellulose (12.6% N, 13.15% N or 13.25% N), a stabilizer, a polymerizable monomer and a catalyst. The nitrocellulose is dried in batch-size amounts until it has a total volatile content of less than 0.5%. The centralites are suitable as plasticizers and also have a stabilizing action in military propellants. The ethyl analog diethyldiphenylurea is known as ethyl centralite or Centralite No. 1. The materials are weighed, placed into a sigma-blade mixer, mixed for 60 to 90 minutes, extruded through a series of screens, a spaghetti plate, and a die of the desired grain size. The resulting product is immediately entered on a curing cycle.

We have found three curing procedures to be effective. In one such procedure, the extruded grains are cut to size and submerged in a saturated solution of sodium chloride and heated at 50° C. for 10–15 hours. Alternately, the extruded grains can be spirally wound with two layers of plastic film such as Saran No. 517, 200 gauge. The wrapped grains are then cured for about 15 hours at 60° C. The plastic film is then removed from the fully polymerized grains and may be reused. In the third technique, the extruded grains are merely placed in a sealed container and heated for 4–5 hours at 70° C. Presently, it appears that curing in a brine solution offers inherent safety advantages not available in the other methods, and this method is currently being used almost exclusively. In each of the foregoing three procedures, a 0.04% concentration of azo-bis-isobutyronitrile is a suitable catalyst for the reaction. Shrinkage of the grains in curing is not excessive—about 2%.

The following tables gives examples of ingredients successfully used in carrying the invention into practice:

TABLE 1.—BASIC COMPOSITIONS FOR POLYMER-GRAIN COMPOSITIONS (BASED ON INCREASING PERCENTAGES OF NITROGLYCERIN)

| Ingredients | Sample | | | | | | | | |
|---|---|---|---|---|---|---|---|---|---|
| | 1 | 2 | 3 | 4 | 5 | 6 | 7 | 8 | 9 |
| Nitrocellulose (13.25% N) | 42 | 41.6 | 41.6 | 38.9 | 39 | 36 | 34 | 36.8 | 35.5 |
| Nitroglycerin | 34 | 34.4 | 34.4 | 38.9 | 39 | 41 | 42.2 | 47.2 | 50.3 |
| Methyl methacrylate | 23 | | 17.3 | 21.4 | 21 | 22 | 15 | 15 | 13.2 |
| Methyl acrylate | | 23.0 | | | | | | | |
| Ethyl acrylate | | | 5.7 | | | | | | |
| Ethyl centralite | 1.0 | 1.0 | 1.0 | 1.0 | 1.0 | 1.0 | 1.0 | 1.0 | 1.0 |
| Potassium perchlorate | | | | | | | 7.8 | | |
| Azo-bis-isobutyronitrile (added) | | .04 | .04 | .04 | | | | | |
| Carbon (added) | | | | .02 | .02 | | | | |
| Lupersol DDM (added) | 1.0 | | | | 1.0 | 1.0 | 1.0 | 1.0 | 1.0 |

Grains produced according to Sample 1 are tough, very hard and have little flexibility. Those of Sample 5 are tough, very hard and quite flexible. Grains from Sample 6 are quite tough, hard and flexible while those of Samples 7 and 8 are fairly tough and quite flexible. Grains from Sample 9 are weak and very flexible. Increase of nitroglycerin content affords markedly higher burning rates of the strands but, as indicated for Sample 9, grains with reduced monomer content are weak physically. Use of cross-linking agents is contemplated for the purpose of obtaining grains of satisfactory strength while maintaining the ballistic advantages of increased nitroglycerin content.

Using Composition 4 in Table 1, the following operative procedure is presently being used to produce propellant grains .375 inch in diameter with or without perforations.

Material Handling

A. Dry nitrocellulose 24 hours at 50° C. or until total volatile content is less than 0.5%.

B. Remove inhibitor from methyl methacrylate by distillation or by several washings with a 20% sodium chloride–5% sodium hydroxide solution.

C. All other ingredients are used as supplied by manufacturer.

Mixing

[One-pint Charles Ross mixer (250-gram capacity)]

A. Charge one-half of all ingredients—mix 10 minutes.

B. Charge one-half of remaining ingredients—mix 10 minutes.

C. Charge remaining ingredients—mix 40 minutes.

D. Control temperature in mixer at ca. 20% throughout mixing cycle.

E. Remove powder from mixer and transport it to extrusion press in sealed container.

Extrusion

[1-inch diameter Elmes Engineering Co. press]

A. Attach .375-inch die, spaghetti plate, and die holder to extrusion press.

B. Place one each 20–40–60 mesh stainless steel screens over spaghetti plate.

C. Load powder into press.

D. Press powder through die by remote control. (No temperature controls are necessary.)

Curing

A. Remove powder from press and cut immediately into desired length.

B. Place cut powder in stainless steel or glass curing vessel which has been filled with a saturated solution of sodium chloride.

C. Place curing vessel in oven at 50° C. for 15 hours.

D. Remove powder from oven and from curing water and wash with tap water.

E. Dry powder in 50° C. oven for 3 hours. Powder is now ready for use.

It is thus clear that we have provided a process resulting in material saving in time and expense over prior art procedures wherein propellant grains of any practicable size may be produced safely and with the use of standard machinery. It is desired to emphasize that grains of any size desired may be produced with equal facility since the curing cycle is substantially independent of the grain size. Furthermore, as indicated, the physical properties of the cured grains may be determined and controlled by varying the amounts and proportions of monomers or by copolymerization. Since no rolling is required, the hazards formerly introduced by such procedure are eliminated.

Since variations of the above-described process and the resulting product will be obvious to those skilled in the art after a study of the preceding disclosure, the disclosure should be taken in an illustrative rather than a limiting sense. It is our desire and intention to be limited only by the subjoined claims.

Having now fully disclosed the invention, what we claim and desire to secure by Letters Patent is:

1. The method of producing rocket propellants comprising thoroughly mixing about 35 to 42 percent of nitrocellulose and about 34 to 50 percent of nitroglycerin with about 13 to 23 percent of a polymerizable monomer solvent selected from the group consisting of lower alkyl acrylates and lower alkyl methacrylates and mixture thereof plus about one percent diethyldiphenyl urea as a stabilizer and 0.04 percent azo-bis-isobutyronitrile as a catalyst, extruding the resulting mixture and curing the same within a temperature range of 40° to 60° C.

2. The method of producing an explosive composition having predetermined physical properties comprising mixing about 35 to 42 percent of nitrocellulose, about 34 to 50 percent of nitroglycerin, about 13 to 23 percent of a polymerizable monomer solvent selected from the group consisting of lower alkyl acrylates and lower alkyl methacrylates and mixture thereof, and about one percent of diethyldiphenyl urea, extruding the mixture and curing the same at a temperature not greater than 60° C. for about 15 hours in a saturated solution of sodium chloride.

3. A homogeneous fuel composition for rockets comprising about 35 to 42 percent nitrocellulose, about 34 to 50 percent nitroglycerin and about 13–23 percent of a ploymerizable monomer solvent selected from the group consisting of lower alkyl acrylates and lower alkyl methacrylates and mixtures thereof, about one percent of diethyldiphenyl urea and about 0.04 percent azo-bis-isobutyronitrile.

4. The composition of claim 3 in which the polymerizable monomer solvent is methly methacrylate.

5. The composition of claim 3 in which the polymerizable monomer solvent is methyl acrylate.

6. The composition of claim 3 in which the polymerizable monomer solvent is ethyl acrylate.

7. The method of producing propellant grains for rocketry comprising thoroughly mixing about 35 to 42 percent nitrocellulose, about 34 to 50 percent of nitroglycerin, about 13 to 23 percent of a polymerizable monomer solvent selected from the group consisting of lower alkyl acrylates and lower alkyl methacrylates and mixtures thereof, about one percent of diethyl-diphenyl urea and about 0.04 per cent azo-bis-isobutyronitrile, extruding the mixture into the desired form and size of grain, wrapping the grain in plastic film, curing the wrapped grain for about 15 hours at a temperature not exceeding 60° C. and removing the plastic film from the completed grain.

8. The process for producing propellant grains which comprises uniformly mixing about 15 to 50% nitrocellulose, about 15 to 60% nitroglycerine, about 5 to 30% of a catalyzed liquid polymerizable material selected from the group consisting of methyl and ethyl esters of acrylic and methacrylic acids, and about 1 percent diethyldiphenyl urea as a stabilizer, extruding the mixture into grains and curing them.

References Cited by the Examiner

UNITED STATES PATENTS

| | | |
|---|---|---|
| 1,788,438 | 1/31 | Norton. |
| 2,147,698 | 2/39 | Goodyear. |
| 2,165,263 | 7/39 | Holm. |
| 2,349,048 | 5/44 | Mackey et al. |
| 2,378,169 | 6/45 | Agre et al. |
| 2,417,090 | 3/47 | Silk et al. |
| 2,471,959 | 5/49 | Hunt _____ 260—89.5 |
| 3,036,939 | 5/62 | Camp _____ 149—98 X |

OTHER REFERENCES

Karrer: Organic Chemistry, 4th English edit., Elsevier Pub. Co. Inc., New York, (1950), pages 384, 390.

CARL D. QUARFORTH, *Primary Examiner.*

ROGER L. CAMPBELL, WILLIAM G. WILES, JAMES JAMES L. BREWRINK, *Examiners.*